(12) United States Patent
Chourasia et al.

(10) Patent No.: US 9,076,182 B2
(45) Date of Patent: Jul. 7, 2015

(54) AUTOMATED FINANCIAL DATA AGGREGATION

(71) Applicant: YODLEE, INC., Redwood City, CA (US)

(72) Inventors: Rohit Chourasia, Bangalore (IN); Shubha Pant, Bangalore (IN)

(73) Assignee: Yodlee, Inc., Redwood City, CA (US)

( * ) Notice: Subject to any disclaimer, the term of this patent is extended or adjusted under 35 U.S.C. 154(b) by 0 days.

(21) Appl. No.: 13/794,708

(22) Filed: Mar. 11, 2013

(65) Prior Publication Data

US 2014/0258063 A1 Sep. 11, 2014

(51) Int. Cl.
 *G06Q 40/00* (2012.01)
 *G06F 17/30* (2006.01)

(52) U.S. Cl.
 CPC ............... *G06Q 40/00* (2013.01); *G06F 17/30* (2013.01); *G06F 17/3089* (2013.01)

(58) Field of Classification Search
 CPC ...... G06Q 40/00; G06F 17/30; G06F 30/3089
 USPC .......................................................... 705/42
 See application file for complete search history.

(56) References Cited

U.S. PATENT DOCUMENTS

| | | | |
|---|---|---|---|
| 6,199,007 B1 | 3/2001 | Zavarehi et al. | |
| 6,278,993 B1 | 8/2001 | Kumar et al. | |
| 6,567,850 B1 | 5/2003 | Freishtat et al. | |
| 6,871,220 B1 | 3/2005 | Rajan et al. | |
| 7,844,472 B1 * | 11/2010 | Akin et al. | 705/2 |
| 8,121,943 B2 | 2/2012 | Elterich | |
| 8,219,473 B2 | 7/2012 | Gardner | |
| 8,244,635 B2 | 8/2012 | Freishtat et al. | |
| 8,300,905 B2 | 10/2012 | Jabri | |
| 8,589,366 B1 * | 11/2013 | Younes et al. | 707/705 |
| 2002/0019810 A1 | 2/2002 | Kumar et al. | |
| 2002/0147805 A1 * | 10/2002 | Leshem et al. | 709/223 |
| 2006/0036966 A1 * | 2/2006 | Yevdayev | 715/779 |
| 2007/0130347 A1 | 6/2007 | Rangan et al. | |
| 2007/0180380 A1 | 8/2007 | Khavari et al. | |

(Continued)

OTHER PUBLICATIONS http://webextract.net/ Feb. 5, 2014.*

(Continued)

*Primary Examiner* — William Rankins
(74) *Attorney, Agent, or Firm* — Fish & Richardson P.C.

(57) ABSTRACT

Methods, systems, and apparatus, including computer programs encoded on computer storage media, for data aggregation. The methods, systems, and apparatus include determining whether a site-specific script for extracting financial data from a particular financial institution website is available; in response to determining that a site-specific script for extracting financial data from the particular financial institution website is not available, generating a site map of web pages and web page segments in the financial institution website, wherein the site map is generated based on at least in part on a statistical analysis of web pages and web page segments that are not in the financial institution website; generating, based on the site map of the financial institution website, a site-specific script for extracting financial data from the financial institution website; and extracting, for one or more users, financial data from the particular financial institution website using the generated site-specific script.

24 Claims, 3 Drawing Sheets

(56) References Cited

U.S. PATENT DOCUMENTS

2011/0047176 A1\* 2/2011 Hoffman ............... 707/769
2011/0125587 A1\* 5/2011 Netzer et al. ........... 705/14.68
2012/0089616 A1 4/2012 Sa'adon
2013/0031018 A1 1/2013 Jellum

OTHER PUBLICATIONS

International Search Report and Written Opinion for International Patent Application No. PCT/US2014/022764, filed Mar. 10, 2014. Received Jun. 26, 2014. 10 pp.

\* cited by examiner

AUTOMATED FINANCIAL DATA AGGREGATION

TECHNICAL FIELD

This specification relates to automating the collection of user financial data for account aggregation.

BACKGROUND

As the Internet has grown in popularity, more users are turning to services provided over the Internet to help manage their finances. These services can be provided by financial institutions, such as banks or credit card companies, or by account aggregators that aggregate and present user-specific financial information from one or more financial institutions. Account aggregation involves obtaining financial information related to one or more accounts of a user and presenting the obtained financial information in one place. Each account can be with a different financial institution.

Users typically use a user name and password to log-in to web page(s) maintained by a financial institution or an account aggregator. From the web page(s), the user can access online banking, electronic bill payment, account aggregation, and other online financial services. Online banking provides a user access to his or her financial information and also offers a number of services to a user. Users can, for example, view their statements online, including transaction details and cancelled checks, transfer balances online, and apply for loans online.

SUMMARY

This specification describes technologies relating to automating the collection of user financial data for account aggregation.

In general, one aspect of the subject matter described in this specification can be embodied in methods that include the actions of determining whether a site-specific script for extracting financial data from a particular financial institution website is available; in response to determining that a site-specific script for extracting financial data from the particular financial institution website is not available, generating a site map of web pages and web page segments in the financial institution website, wherein the site map is generated based on at least in part on a statistical analysis of (i) web pages and (ii) web page segments that are not in the financial institution website; generating, based on the site map of the financial institution website, a site-specific script for extracting financial data from the financial institution website; and extracting, for one or more users, financial data from the particular financial institution website using the generated site-specific script. Other embodiments of this aspect include corresponding systems, apparatus, and computer programs recorded on computer storage devices, each configured to perform the operations of the methods.

These and other embodiments can each optionally include one or more of the following features. Generating a site map of web pages and web page segments in the financial institution website, wherein the site map is generated based on at least in part on a statistical analysis of (i) web pages and (ii) web page segments that are not in the financial institution website includes: crawling the financial institution website to identify one or more web pages in the financial institution website and one or more web page segments in the one or more web pages in the financial institution website; determining, based on the statistical analysis, respective categorizations for the one or more identified web pages; and determining, based on the statistical analysis, respective categorizations for the one or more web page segments in the identified one or more web pages.

Determining, based on the statistical analysis, respective categorizations for the one or more identified web pages includes: determining a respective plurality of scores for each web page in the one or more identified web pages, each score in the plurality of scores indicating a confidence that the web page corresponds to a particular category; determining, for each web page in the one or more identified web pages, whether a score in the respective plurality of scores satisfies a threshold; and in response to determining that a score in the respective plurality of scores for a web page satisfies a threshold, associating the web page in the one or more web pages with a particular category corresponding to the score. The method further includes in response to determining that no score in the respective plurality of scores for a web page satisfy a threshold, providing the web page to a user for manual categorization; and associating the web page with a category specified by the user.

Determining, based on the statistical analysis, respective categorizations of one or more web page segments in the one or more web pages in the financial institution website includes: determining a respective plurality of scores for each web page segment in the one or more web pages, each score in the plurality of scores indicating a confidence that a web page segment corresponds to a particular category; determining, for each web page segment, whether a score in the respective plurality of scores satisfies a threshold; and in response to determining that a score in the respective plurality of scores for a web page segment satisfies a threshold, associating the web page segment with a particular category corresponding to the score. The method further includes in response to determining that no score in the respective plurality of scores for a web page segment satisfy a threshold, providing the web page segment to a user for manual categorization; and associating the web page segment with a category specified by the user.

The statistical analysis of (i) web pages and (ii) web page segments includes: generating, based on one or more machine learning techniques, a first data model that models a relationship between a serialized DOM of web pages to respective categories of the web pages; generating, based on one or more machine learning techniques, a second data model that models a relationship between a serialized DOM of web page segments to respective categories of the web page segments; and using the first and second data models to respectively categorize web pages and web page segments in the financial institution website. Generating, based on the site map of the financial institution website, a site-specific script for extracting financial data from the financial institution website does not require human input.

Particular embodiments of the subject matter described in this specification can be implemented so as to realize one or more of the following advantages. Scripts for extracting financial information from financial institution website's can be generated automatically without having to be created by human input. Scripts will be self-maintained and will automatically adjust to any changes in financial institution websites.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

Figure 1:
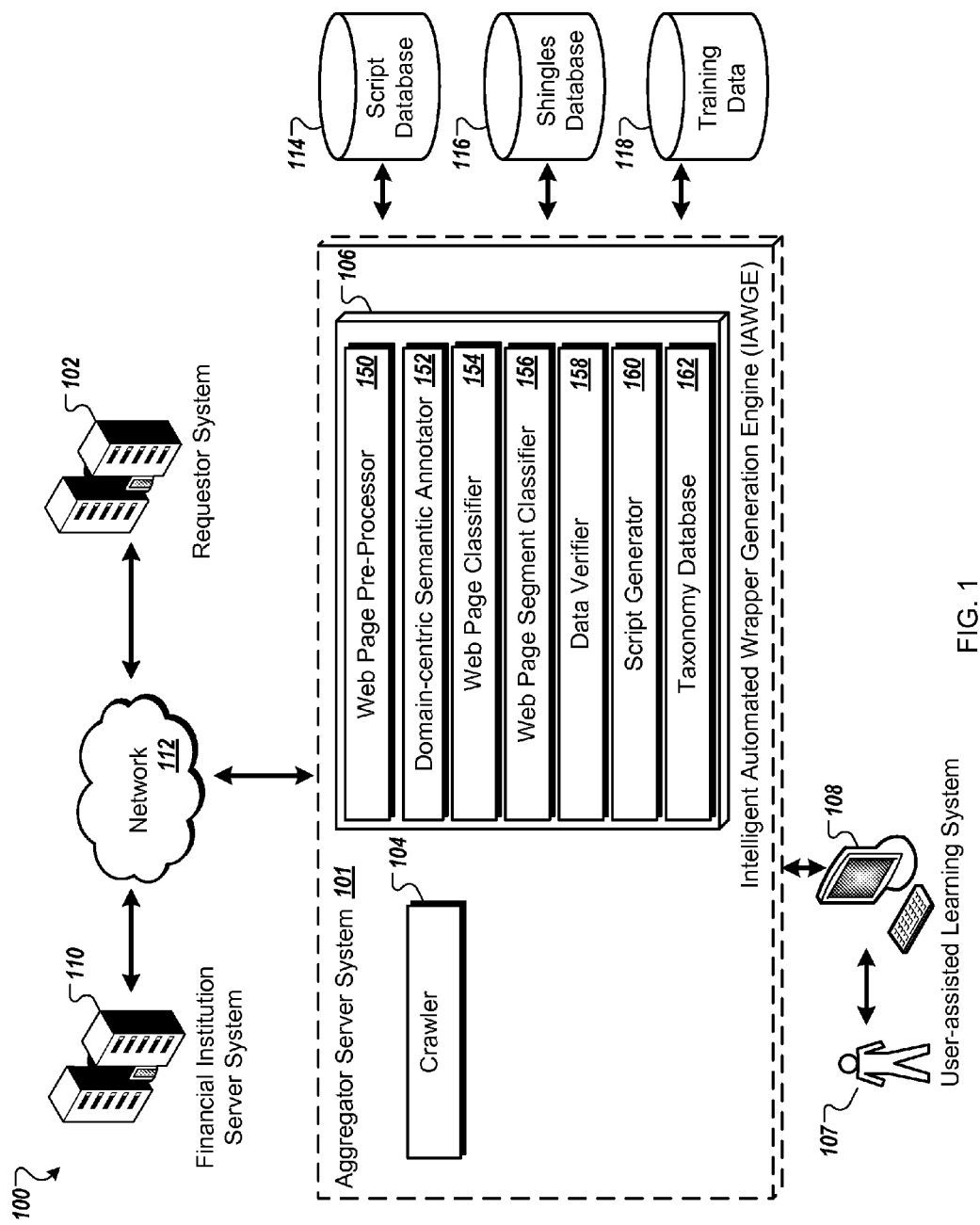
FIG. 1 illustrates an example aggregation system used for automatically aggregating financial data from a financial website.

FIG. 1 illustrates an example aggregation system 100 used for automatically aggregating financial data from a financial website. An aggregator server system 101, a requestor system 102, e.g., a desktop or laptop computer, and one or more financial institution server systems, e.g., the system 110, are connected through a network 112. The aggregator server system 101, the requestor system 102, and the financial institution server system 110 can include one or more computing devices. The aggregator server system 101 includes a crawler 104 and an Intelligent Automated Wrapper Generation Engine (IAWGE) 106. The IAWGE 106 includes a web page pre-processor 150, a domain-centric semantic annotator 152, a web page classifier 154, a web page segment classifier 156, a data verifier 158, a site-script generator 160, and a taxonomy database 162. The aggregator server system 101 can also communicate with a user-assisted learning system 108, one or more databases, e.g., a script database 114, a shingles database 116, and a training data database 118, as described below.

Each financial institution is an institution that provides financial services, deals in financial instruments, or lends, invests, or stores money. Examples of financial institutions include banks, brokerage firms, credit card companies, credit unions, and savings and loans. Each financial institution stores financial information about users that have a financial account with the respective financial institution. A user can have an account with the financial institution when, for example, the user deposits money at the institution or has a line of credit provided by the financial institution.

Financial information, or financial data, includes, for example, customer data, account data, financial institution data, payee data, and transaction data. Customer data includes the customer's name and contact information, e.g., the customer's address, telephone number, and email address. Customer data can also include the customer's password or PIN. Account data includes the customer's account numbers, financial institutions, and account balances. The financial institution data includes the financial institution's name and address and the financial institution's ABA or routing number.

Users with respective accounts with a financial institution can use a user device to access financial information related to their account with the financial institution. The users can access this information through an interface provided by the financial institution, for example, through the financial institution's website. Some examples of user devices include computers, tablets, and mobile devices, e.g., cellular phones. A user device can present a user interface through, for example, a computer program that presents data, e.g., text and images, in a format specified by the aggregator server system 101.

In some implementations, the user interface is presented in a web browser. The web browser receives one or more web pages from the aggregator server system 101 and presents the web pages to the user. Presenting the user interfaces to the user can include displaying the user interfaces on a computer monitor or other display device. Presenting the user interfaces can also include any other method of conveying information to the user, for example presenting sounds corresponding to the user interfaces or providing haptic feedback corresponding to the user interfaces.

The requestor system 102 is configured to request aggregated user financial data from the aggregator server system 101. In particular, the requestor system 102 can request aggregated financial data for a particular user's account in a particular financial institution. In response to receiving a request, the aggregator server system 101 can obtain the user's financial data from the particular financial institution's server system.

The aggregator server system 101 runs applications that provide various services to users, including account aggregation. As used in this specification, account aggregation involves collecting financial information about a user. Data representing this information is optionally stored in a data repository, e.g., a database, on the aggregator server system 101. Financial information can be collected in different ways. In some implementations, information is received directly from the system 110. In some implementations, the aggregator server system 101 runs one or more agents to extract user-specific financial information from various web pages and other consumer-accessible channels, for example public OFX feeds. A public OFX feed is a stream of financial data sent to another computer, for example, over the Internet, by a server of one or more financial institutions, where the data is formatted in accordance with the Open Financial Exchange standard.

An agent is a computer program that extracts financial information by, for example, extracting financial information from data feeds. Agents can also collect transaction data using other techniques. For example, agents can navigate to relevant websites, and parse the HTML code of the web pages in the websites to extract transaction data based on a script. A web page is a block of data identified by a URL that is available on the Internet. One example of a web page is a HyperText Markup Language (HTML) file. Web pages commonly contain content; however, web pages can also refer to content outside the web page that is presented when the web page loads in a user's web browser. Web pages can also generate content dynamically based on interactions with the user.

When collecting financial information about a user 102 from a particular financial institution, the aggregator server system 101 typically logs into to the user's account on the financial institution's website using the user's login credentials, e.g., login and password, for the website. The login credentials for the user's account are provided to the aggregator server system 101 by the user. In some implementations, the aggregator server system 101 logs into the user's account on the financial institution's website using an access token that was generated by the financial institution's server system. Each access token is specific to each user and can be, for example, an alphanumeric string of characters. The access token can be generated in response to a user successfully logging into the user's account for a financial institution, for example, through the financial institution's website. Access tokens can be generated using conventional token generating algorithms, including, for example, token generation capabilities provided in the OAuth open authorization framework.

When collecting financial information about the user from the particular financial institution, the aggregator server system 101 determines whether a site-specific script for the financial institution's website is available, for example, in the script database 114. Site-specific scripts can be pre-generated by IAWGE 106 or by humans, sometimes with input from the user. Each site-specific script can be written using automatic controls, e.g., Object Linking and Embedding (OLE) and/or a programming language, e.g., Perl. These techniques are explained in more detail in U.S. Pat. Nos. 6,871,220; 6,567,850; 6,278,993; 6,199,007 and 7,200,804, and U.S. Patent Publications 2002/0019810, 2007/0180380 and 2007/0130347, all of which are incorporated by reference.

Each site-specific script identifies, for a particular website, the types of web pages in the website. For example, the script can include a site map that associates respective categories (e.g., a login page, a terms and conditions page, a checking accounts page, a savings accounts page, a credit card accounts page, an accounts summary page, etc.) for each web page in the particular website based on the web page's type. The script can also include respective categories (e.g., a table describing a summary of accounts, a table describing transactions for a particular credit card, a paginated table describing savings account transactions, types of data included in cells in a table, types of input fields, etc.) of the types of segments in each web page in the website. Web page types and the types of segments in the web pages can be determined using a serialized document object model (DOM) of the respective web pages. Additionally, the site-specific script specifies respective actions for the aggregator server system 101 to perform in response to encountering particular types of web pages and particular types of web page segments in the financial institution's website. For example, an action can instruct the aggregator server system 101 to extract certain types of data (e.g., transaction number, payee, amount paid, and date of transaction) in response to encountering a table describing transactions for a particular credit card.

The aggregator server system 101 includes a crawler 104 that is configured to execute the site-specific script for the financial institution's website to collect financial information about the user from the particular financial institution's website. Upon executing the script, the crawler 104 can establish a connection with the financial institution's website using, for example, the HyperText Transfer Protocol (HTTP). Once connected, the crawler 104 crawls the financial institution's website based on a site map of the financial institution's website as specified in the site-specific script. In particular, the site-specific script can specify particular web pages and web page segments from which financial data should be extracted. In some implementations, the crawler 104 is instructed to avoid crawling certain web pages or web page segments based on one or more rules. For example, the crawler 104 can be instructed to avoid crawling web pages that have been determined to be a terms and conditions web page or web page segments that correspond to a link for deleting a financial account.

The site-specific script also includes corresponding actions to be performed by the aggregator server system 101 when a particular web page or web page segment is encountered by the crawler 104. For example, when a login web page is encountered, the script can include an action that instructs the aggregator server system 101 to provide the user's login credentials to the relevant input fields (e.g., the username and password fields) in the login web page. The script can also include an action that instructs the aggregator server system 101 to extract (e.g., screen scrape) financial data in response to encountering particular types of web pages and web page segments. For example, if the aggregator server system 101 encounters an accounts summary page, the script can instruct the aggregator server system 101 to extract financial data from web page segments in the accounts summary page that are specified in the script.

In some implementations, when a site-specific script for the financial institution's website is not available, for example, in a script database 114, the aggregator server system 101 is configured to automatically generate a site-specific script for the financial institution's website. In some implementations, the aggregator server system 101 generates a site-specific script for a financial institution's website when a site-specific script for the financial institution's website exists but is unsuccessful in extracting financial data from the financial institution's website. A script's success is determined based on rules defined in the data verifier 158, as described below. For example, a site-specific script can be unsuccessful in extracting financial data when a site map of a financial institution's website has changed due to the addition or removal of web pages or due to changes in structure (e.g., a serialized DOM) of web pages in the financial institution's website.

In such implementations, when generating a site-specific script for the financial institution's website, the aggregator server system 101 uses the crawler 104 to crawl the financial institution's website. The crawler 104 includes one or more bots, or agents, that are configured to generate a site map of the financial institution's website by serializing a document object model (DOM) of the financial institution's website, for example, in the form of an extensible markup language (XML) document. In some implementations, the aggregator server system 101 serializes a DOM of a web page or a web page segment using operations provided in a DOM Application Programming Interface (API), e.g., libxml2, MSXML, or Xerces.

In more detail, when generating the site map of the financial institution's website, the crawler 104 serializes live DOM of each web page in the financial institution's website, and of each web page segment in each web page of the financial institution's website. The crawler 104 is configured to version the serialized DOM for the financial institution's website using, for example, a timestamp, and to store a copy of the serialized DOM in a database, e.g., the shingles database 116.

Once a serialized DOM of the financial institution's website is generated, the aggregator server system 101 interacts with a web page classifier 154 to categorize web pages in the financial institution's website. The web page classifier 154 is configured to categorize web pages into one or more web page types based on one or more classification techniques. In some implementations, the classification techniques include conventional machine learning techniques. For example, Naïve Bayes classification can be used when categorizing a login web page or a transaction search web page. In some implementations, the classification techniques include a combination of a genetic algorithm with a Naïve Bayes classifier and/or a decision tree to form a multi-level classification framework. For example, a multi-level classification framework can be used to categorize table data or list data (e.g., an accounts listing or a listing of transactions). The multi-level classification framework can apply one or more algorithms for filtering web pages and web page segments. The algorithms can be supervised to bootstrap, unsupervised, and/or genetic). The multi-level classification framework can generate, for a particular web page or web page segment, a score that measures a confidence that the web page, or web page segment, is of a particular type. The score is generated based on an average weighted score that considers respective scores generated by the algorithms in the multi-level classification framework.

The web page pre-processor 150 is configured to clean HTML for web pages. The cleaning can include word stemming and removing stop words from the HTML. The web page pre-processor 150 is also configured to apply DOM transformations to remove unnecessary noise/tags.

The domain-centric semantic annotator 152 is configured to enrich a web page using domain-centric annotation and a natural language processing engine. The domain-centric semantic annotator 152 provides domain-centric semantics to HTML tags, e.g., date, money, account, etc.

The web page classifier 154 is a data model that models a relationship between a serialized DOM of a web page and whether the web page is of a particular category (e.g., a login page, a terms and conditions page, a savings accounts page, a credit card accounts page, an accounts summary page, etc.). In particular, the web page classifier 154 is trained to model this relationship by analyzing training data that includes a collection of data pairs that include data describing a serialized DOM of a web page of a particular type as the input and data describing whether the web page is of the particular type as the output.

For example, the training data can include a first data pair for a first login web page includes data describing the serialized DOM of the first login web page as the input and data describing a value indicating that the first login web page is a login web page as the output, a second data pair for a second login web page includes data describing the serialized DOM of the second login web page and data describing a value indicating that the second login web page is a login web page, and a third data pair for a third login web page includes data describing the serialized DOM of the third login web page and data describing a value indicating that the third login web page is a login web page. Each of the first, second, and third login pages can vary in appearance and DOM structure. After training, the web page classifier 154 can evaluate a new web page encountered in a financial institution's website and determine whether the new web page is a login web page by evaluating patterns in the web page's appearance and DOM structure in reference to the training data. The taxonomy database 162 is used as a bootstrap with a domain-centric dictionary that minimizes the training process and makes the training process more efficient.

Once training is complete, the web page classifier 154 can generate, for new web pages, respective scores that measure a confidence that the web page is of a particular web page type. When encountering a new web page, the web page classifier 154 can generate a vector of scores, and each score indicating a confidence that the web page is of a particular webpage type. For example, for a web page, the web page classifier 154 can generate a vector of scores [0.9, 0.2, 0.3] indicating that the web page has a confidence of 0.9 that the web page is a login web page, a confidence of 0.2 that the web page is a terms and conditions web page, and a confidence of 0.3 that the web page is an accounts page. If a score in the vector of scores satisfies a specified threshold, the web page classifier 154 categorizes the web page as being of the particular type corresponding to the score. Thus, for example, if the specified threshold is 0.8, the web page classifier 154 can determine that the web page is a login web page, since the vector of scores indicates that this web page has a confidence of 0.9 that the web page is a login web page.

The aggregator server system 101 also interacts with a web page segment classifier 156 to categorize segments (e.g., a table describing a summary of accounts, a table describing transactions for a particular credit card, a paginated table describing savings account transactions, types of data included in cells in a table, types of input fields, etc.) in the categorized web pages. The web page segment classifier 156 is a data model that models a relationship between a serialized DOM of a web page segment and whether the web page segment is of a particular category. The web page segment classifier 156 is configured to categorize web page segments using one or more classification techniques, as described above. In particular, the web page segment classifier 156 is trained to model this relationship by analyzing training data that includes a collection of data pairs that include data describing serialized DOMs of web page segments as the input and data describing a value that indicates that the web page segment is of a particular type.

Once training is complete, the web page segment classifier 156 can generate, for new segments in web pages, respective scores that measure a confidence that the web page segment is of a particular web page segment type. When encountering a new web page segment in a web page, the web page segment classifier 156 can generate a vector of scores, and each score indicating a confidence that the web page segment is of a particular webpage segment type. For example, for a web page segment, the web page segment classifier 156 can generate a vector of scores [0.7, 0.0, 0.1, 0.3, 0.5] indicating that the web page segment has a confidence of 0.7 that the web page segment is a table describing a summary of accounts, a confidence of 0.0 that the web page segment is a table describing transactions for a particular credit card, a confidence of 0.1 that the web page segment is a table describing savings account transactions, a confidence of 0.3 that the web page segment is a paginated table describing transactions for a particular credit card, and a confidence of 0.5 that the web page segment is a paginated table describing savings account transactions. If a score in the vector of scores satisfies a specified threshold, the web page segment classifier 156 categorizes the web page segment as being of the particular type corresponding to the score. Thus, for example, if the specified threshold is 0.7, the web page segment classifier 156 can determine that the web page segment is a table describing a summary of accounts, since the vector of scores indicates that this web page segment has a confidence of 0.7 that the web page segment is a table describing a summary of accounts.

The web page classifier 154 and the web page segment classifier 156 interact with a taxonomy database 162 to learn new domain dictionary terms.

In some implementations, when the web page classifier 154 is unable to determine a category for a web page (e.g., when none of the scores in the vector of scores satisfy a specified threshold), the aggregator server system 101 interacts with the user-assisted learning system 108 to categorize the web page. In particular, the aggregator server system 108 provides the uncategorized web page to the user-assisted learning system 108. The user-assisted learning system 108 presents, to a user 107, an interface that displays a rendered version of the uncategorized web page together with a serialized DOM of the uncategorized web page. The user 107 can interact with the user-assisted learning system 108 to manually review and categorize the web page as being of a particular type of web page (e.g., a login web page). For example, the user 107 can categorize web pages by selecting a web page category from a listing of predefined web page types.

Similarly, the aggregator server system 101 can also interact with the user-assisted learning system 108 to categorize web page segments that the web page segment classifier 156 was unable to categorize. For example, the user can interact with the user-assisted learning system 108 to identify particular segments in the serialized DOM of the particular web page as being a particular web page segment (e.g., identifying a particular table in the serialized DOM as being a paginated table of credit card transactions). Further, the user can interact with the user-assisted learning system 108 to identify fields within particular web page segments (e.g., identifying a particular field in the serialized DOM as being a field in a paginated table of credit card transactions that includes data describing a transaction amount). In some implementations, categorized web pages are used to re-train the web page classifier 154. Similarly, categorized web page segments can be used to re-train the web page segment classifier 156. This training process also results in updating the taxonomy database 162.

Once web pages and web page segments in the financial institution's website are categorized, the aggregator server system 101 interacts with a site-script generator 160 to generate a script for extracting financial information from the financial institution's website. As described above, each site-specific script identifies, for a particular website, the types of web pages in the website. The site-specific script can also include respective categorizations of the segments in each web page in the website. Additionally, the script specifies respective actions for the aggregator server system 101 to perform in response to encountering particular types of web pages and particular types of web page segments in the financial institution's website.

The taxonomy database 162 includes a repository of domain dictionary/domain specific terms mapped to a structured data class to be extracted from target web page or to provide input (e.g., a user's login and password input) to the target web page by the aggregator server system 101 in response to encountering a particular web page or web page segment. For example, if the aggregator server system 101 encounters a web page is a login page, then the aggregator server system 101 uses data from the taxonomy database 162 to locate the login and password fields and to provide to the login and password fields input provided by user. Similarly, if the aggregator server system 101 encounters a web page segment that is a paginated list of transactions, then using data from the taxonomy database 162, the aggregator server system 101 extracts financial information from one or more particular fields in the paginated list of transactions based on locations specified in the taxonomy database 162.

The taxonomy can be arranged using containers that each correspond to a type of web page (e.g., a login page, a checking accounts page, a credit card web page, a loans web page, an investments web page, a mortgage web page, a rewards web page, etc.). Within each container are sub-containers that correspond to segments that are expected to be found in the web page corresponding to the container. For example, a container for a login web page can include sub-containers that correspond to web page segments identifying a login input field, a password input field, a login submit button. Each sub-container can include a respective action for the aggregator server system 101 to take when a particular web page segment is encountered. For example, the sub-container for the login input field can include an action that instructs the aggregator server system 101 to input a user's login. Similarly, the sub-container for the password input field can include an action that instructs the aggregator server system 101 to input the user's password. Next, the sub-container for the login submit button can include an action that instructs the aggregator server system 101 to select the login submit button once the user's login and password have been input.

The data verifier 158 is configured to verify data based on pre-configured rules to determine whether a site-specific script was successfully executed. For example, assuming a web page in a financial institution website undergoes a minor structural change, e.g., a change in the DOM structure, a script extracting financial information from the web page may not encounter a parsing error. However, using the data verifier 158, the change in the DOM structure can be detected by identifying any missing fields (e.g., login fields) or incorrect field values. For example, suppose in a 3×3 table, in which a first column represented an account number, was changed so that the second column represents the account number. In this case, the script for the financial institution website will attempt to extract financial information (e.g., the account number) from the first column, which can contain no data or data that is different from account numbers, and will not encounter a parsing error. However, the data verifier 158 can determine that the extracted financial information is not composed of account numbers. Accordingly, the data verifier 158 can request that the IAWGE 106 re-generate the script.

Figure 2:
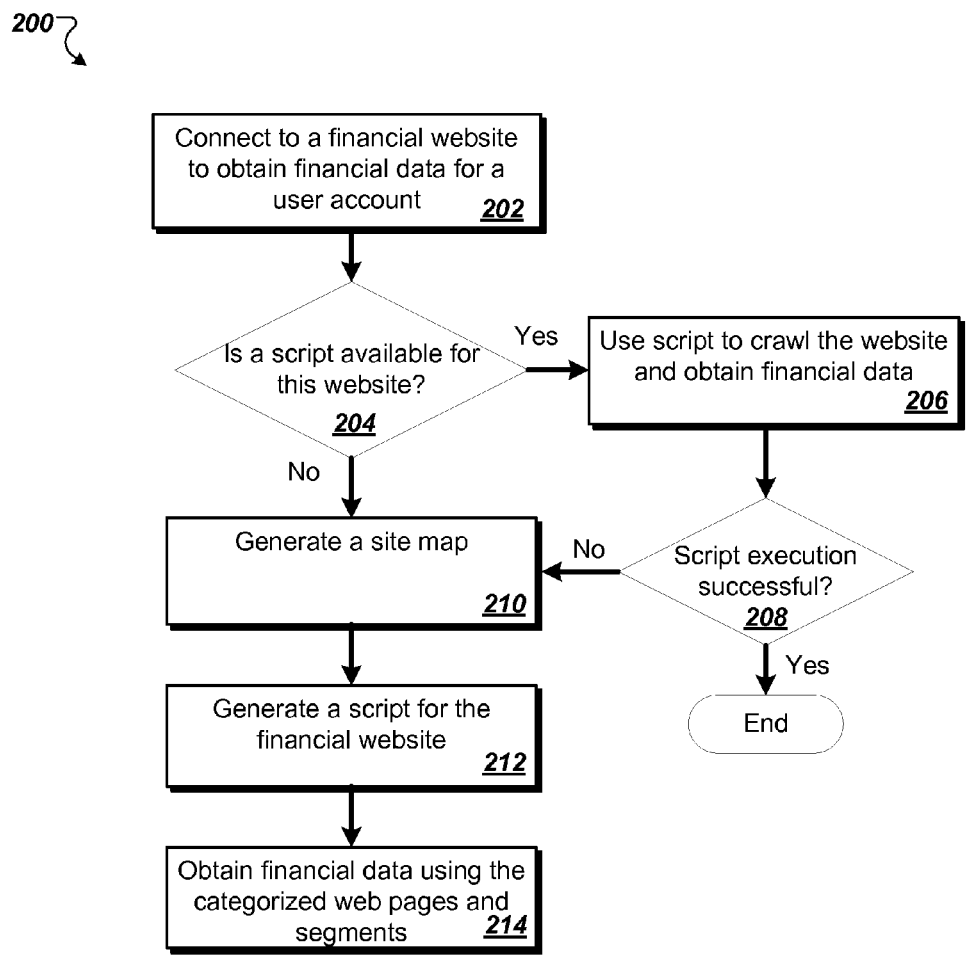
FIG. 2 illustrates an example flow diagram illustrating an example technique for automatically aggregating financial data from a financial website.

FIG. 2 illustrates an example method 200 for extracting financial data from a financial institution's website. For convenience, the example method 200 will be described in reference to a system that performs the method 200. The system can be, for example, the aggregator server system 101.

The system connects to a financial institution's website to obtain financial data for a user account (step 202). As described above, the system can establish a connection with the financial institution's website using, for example, the HyperText Transfer Protocol (HTTP).

The system determines whether a site-specific script is available for the financial institution's website (step 204). The system can determine whether a site-specific script for the financial institution's website exists by interacting with a script database 114, as described above in reference to FIG. 1.

Based on a determination that a site-specific script for the financial institution's website is available, the system executes the script to crawl and obtain financial data from the financial institution's website, as described above in reference to FIG. 1. (step 206).

The system determines if the site-specific script was executed successfully (208). For example, the system can determine whether a site-specific script was successfully executed by evaluating return codes provided by the script and/or data verified by the data verifier 158.

Based on a determination that a site-specific script for the financial institution's website is not available or based on a determination that the site-specific script for the financial institution's website was not successfully executed, the system crawls the financial institution's website and generates a site map of the financial institution's website (step 210). The system can generate a site map for the financial institution's website using methods described above in reference to FIG. 1. When generating a site map, the system categorizes web pages in the financial institution's website and segments in the web pages in the financial institution's website.

The system generates a site-specific script for the financial institution's website using the categorized web pages and segments in the web pages (step 212). For example, the system can generate a site-specific script for the financial institution's website using the categorized web pages and web page segments, using taxonomy database 162. The site-specific script, when executed, will provide the system with step-by-step instructions on what actions to perform when a particular web page type is encountered and what actions to perform in response to encountering particular web page segments.

The system executes the site-specific script to obtain financial data from the financial institution's website (step 214). As described above, when executed, the site-specific script will instruct the system to extract financial data from certain web pages and web page segments. The system can store this extracted data in a database for use in aggregating financial data for the user's financial accounts.

Figure 3:
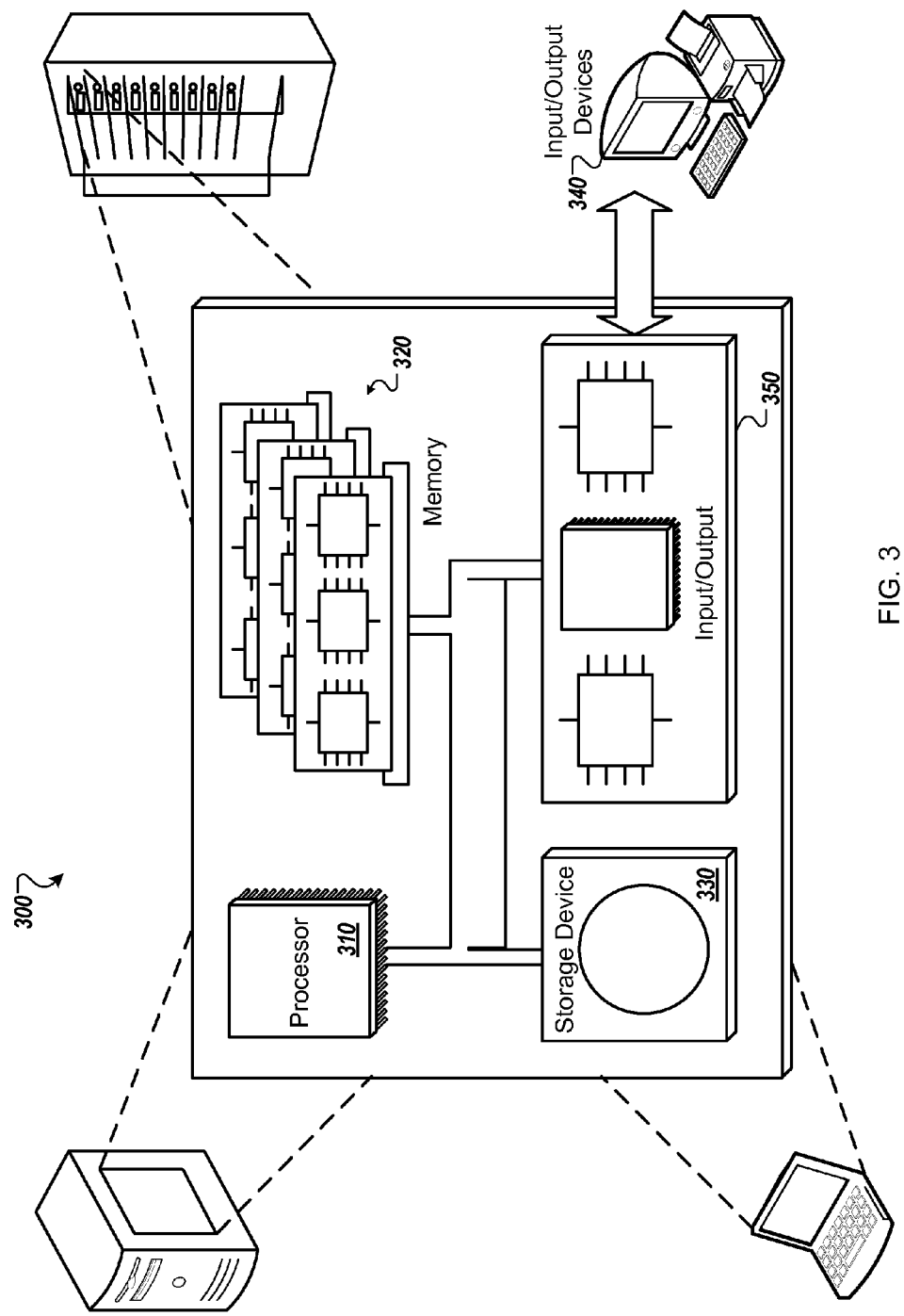
FIG. 3 is a schematic diagram of an example of a generic computer system.

FIG. 3 is a schematic diagram of an example of a generic computer system 300. The system 300 can be used for the operations described above. For example, the system 300 may be included in either or all of the aggregator's server system 101, the financial institution server system 110, or the user device 104.

The system 300 includes a processor 310, a memory 320, a storage device 330, and an input/output device 340. Instructions that implement operations associated with the methods described above can be stored in the memory 320 or on the storage device 330. Each of the components 310, 320, 330, and 340 are interconnected using a system bus 350. The processor 310 is capable of processing instructions for execution within the system 300. In some implementations, the processor 310 is a single-threaded processor. In another implementation, the processor 310 is a multi-threaded processor. The processor 310 is capable of processing instructions stored in the memory 320 or on the storage device 330 to display graphical information for a user interface on the input/output device 340.

The memory 320 stores information within the system 300. In some implementations, the memory 320 is a computer-readable medium. In some implementations, the memory 320 is a volatile memory unit. In another implementation, the memory 320 is a non-volatile memory unit.

The storage device 330 is capable of providing mass storage for the system 300. In some implementations, the storage device 330 is a computer-readable medium. In various different implementations, the storage device 330 may be a floppy disk device, a hard disk device, an optical disk device, or a tape device.

The input/output device 340 provides input/output operations for the system 300. In some implementations, the input/output device 340 includes a keyboard and/or pointing device. In another implementation, the input/output device 340 includes a display unit for displaying graphical user interfaces.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions encoded on a computer storage medium for execution by, or to control the operation of, data processing apparatus. The computer storage medium can be a machine-readable storage device, a machine-readable storage substrate, a random or serial access memory device, or a combination of one or more of them. Alternatively or in addition to being encoded on a storage medium, the program instructions can be encoded on a propagated signal that is an artificially generated signal, e.g., a machine-generated electrical, optical, or electromagnetic signal, that is generated to encode information for transmission to suitable receiver apparatus for execution by a data processing apparatus.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
   determining, in a computer, whether a site-specific script for extracting financial data from a particular financial institution website is available;
   in response to determining that a site-specific script for extracting financial data from the particular financial institution website is not available, generating, in the computer, a site map of web pages and web page segments in the financial institution website, wherein the site map is generated based at least in part on a statistical analysis of (i) web pages and (ii) web page segments that are not in the financial institution website;
   generating, in the computer, based on the site map of the financial institution website, a site-specific script for extracting financial data from the financial institution website; and
   extracting, in the computer, for one or more users, financial data from the particular financial institution website using the generated site-specific script.

2. The method of claim 1, wherein generating a site map of web pages and web page segments in the financial institution website, wherein the site map is generated based at least in part on a statistical analysis of (i) web pages and (ii) web page segments that are not in the financial institution website comprises:
   crawling the financial institution website to identify one or more web pages in the financial institution website and one or more web page segments in the one or more web pages in the financial institution website;
   determining, based on the statistical analysis, respective categorizations for the one or more identified web pages; and
   determining, based on the statistical analysis, respective categorizations for the one or more web page segments in the identified one or more web pages.

3. The method of claim 2, wherein determining, based on the statistical analysis, respective categorizations for the one or more identified web pages comprises:
   determining a respective plurality of scores for each web page in the one or more identified web pages, each score in the plurality of scores indicating a confidence that the web page corresponds to a particular category;
   determining, for each web page in the one or more identified web pages, whether a score in the respective plurality of scores satisfies a threshold; and
   in response to determining that a score in the respective plurality of scores for a web page satisfies a threshold, associating the web page in the one or more web pages with a particular category corresponding to the score.

4. The method of claim 3, further comprising:
   in response to determining that no score in the respective plurality of scores for a web page satisfy a threshold, providing the web page to a user for manual categorization; and
   associating the web page with a category specified by the user.

5. The method of claim 2, wherein determining, based on the statistical analysis, respective categorizations of one or more web page segments in the one or more web pages in the financial institution website comprises:
   determining a respective plurality of scores for each web page segment in the one or more web pages, each score in the plurality of scores indicating a confidence that a web page segment corresponds to a particular category;
   determining, for each web page segment, whether a score in the respective plurality of scores satisfies a threshold; and
   in response to determining that a score in the respective plurality of scores for a web page segment satisfies a threshold, associating the web page segment with a particular category corresponding to the score.

6. The method of claim 5, further comprising:
   in response to determining that no score in the respective plurality of scores for a web page segment satisfy a threshold, providing the web page segment to a user for manual categorization; and
   associating the web page segment with a category specified by the user.

7. The method of claim 1, wherein the statistical analysis of (i) web pages and (ii) web page segments comprises:
   generating, based on one or more machine learning techniques, a first data model that models a relationship between a serialized DOM of web pages to respective categories of the web pages;
   generating, based on one or more machine learning techniques, a second data model that models a relationship between a serialized DOM of web page segments to respective categories of the web page segments; and using the first and second data models to respectively categorize web pages and web page segments in the financial institution website.

8. The method of claim 1, wherein generating, based on the site map of the financial institution website, a site-specific script for extracting financial data from the financial institution website does not require human input.

9. A non-transitory computer storage medium encoded with a computer program, the program comprising instructions that when executed by data processing apparatus cause the data processing apparatus to perform operations comprising:
  determining whether a site-specific script for extracting financial data from a particular financial institution website is available;
  in response to determining that a site-specific script for extracting financial data from the particular financial institution website is not available, generating a site map of web pages and web page segments in the financial institution website, wherein the site map is generated based at least in part on a statistical analysis of (i) web pages and (ii) web page segments that are not in the financial institution website;
  generating, based on the site map of the financial institution website, a site-specific script for extracting financial data from the financial institution website; and
  extracting, for one or more users, financial data from the particular financial institution website using the generated site-specific script.

10. The medium of claim 9, wherein generating a site map of web pages and web page segments in the financial institution website, wherein the site map is generated based at least in part on a statistical analysis of (i) web pages and (ii) web page segments that are not in the financial institution website comprises:
  crawling the financial institution website to identify one or more web pages in the financial institution website and one or more web page segments in the one or more web pages in the financial institution website;
  determining, based on the statistical analysis, respective categorizations for the one or more identified web pages; and
  determining, based on the statistical analysis, respective categorizations for the one or more web page segments in the identified one or more web pages.

11. The medium of claim 10, wherein determining, based on the statistical analysis, respective categorizations for the one or more identified web pages comprises:
  determining a respective plurality of scores for each web page in the one or more identified web pages, each score in the plurality of scores indicating a confidence that the web page corresponds to a particular category;
  determining, for each web page in the one or more identified web pages, whether a score in the respective plurality of scores satisfies a threshold; and
  in response to determining that a score in the respective plurality of scores for a web page satisfies a threshold, associating the web page in the one or more web pages with a particular category corresponding to the score.

12. The medium of claim 11, further comprising:
  in response to determining that no score in the respective plurality of scores for a web page satisfy a threshold, providing the web page to a user for manual categorization; and
  associating the web page with a category specified by the user.

13. The medium of claim 10, wherein determining, based on the statistical analysis, respective categorizations of one or more web page segments in the one or more web pages in the financial institution website comprises:
  determining a respective plurality of scores for each web page segment in the one or more web pages, each score in the plurality of scores indicating a confidence that a web page segment corresponds to a particular category;
  determining, for each web page segment, whether a score in the respective plurality of scores satisfies a threshold; and
  in response to determining that a score in the respective plurality of scores for a web page segment satisfies a threshold, associating the web page segment with a particular category corresponding to the score.

14. The medium of claim 13, further comprising:
  in response to determining that no score in the respective plurality of scores for a web page segment satisfy a threshold, providing the web page segment to a user for manual categorization; and
  associating the web page segment with a category specified by the user.

15. The medium of claim 9, wherein the statistical analysis of (i) web pages and (ii) web page segments comprises:
  generating, based on one or more machine learning techniques, a first data model that models a relationship between a serialized DOM of web pages to respective categories of the web pages;
  generating, based on one or more machine learning techniques, a second data model that models a relationship between a serialized DOM of web page segments to respective categories of the web page segments; and
  using the first and second data models to respectively categorize web pages and web page segments in the financial institution website.

16. The medium of claim 9, wherein generating, based on the site map of the financial institution website, a site-specific script for extracting financial data from the financial institution website does not require human input.

17. A system comprising one or more computers programmed to perform operations comprising:
  determining whether a site-specific script for extracting financial data from a particular financial institution website is available;
  in response to determining that a site-specific script for extracting financial data from the particular financial institution website is not available, generating a site map of web pages and web page segments in the financial institution website, wherein the site map is generated based at least in part on a statistical analysis of (i) web pages and (ii) web page segments that are not in the financial institution website;
  generating, based on the site map of the financial institution website, a site-specific script for extracting financial data from the financial institution website; and
  extracting, for one or more users, financial data from the particular financial institution website using the generated site-specific script.

18. The system of claim 17, wherein generating a site map of web pages and web page segments in the financial institution website, wherein the site map is generated based at least in part on a statistical analysis of (i) web pages and (ii) web page segments that are not in the financial institution website comprises:
  crawling the financial institution website to identify one or more web pages in the financial institution website and one or more web page segments in the one or more web pages in the financial institution website;

determining, based on the statistical analysis, respective categorizations for the one or more identified web pages; and determining, based on the statistical analysis, respective categorizations for the one or more web page segments in the identified one or more web pages.

19. The system of claim 18, wherein determining, based on the statistical analysis, respective categorizations for the one or more identified web pages comprises:

determining a respective plurality of scores for each web page in the one or more identified web pages, each score in the plurality of scores indicating a confidence that the web page corresponds to a particular category;

determining, for each web page in the one or more identified web pages, whether a score in the respective plurality of scores satisfies a threshold; and in response to determining that a score in the respective plurality of scores for a web page satisfies a threshold, associating the web page in the one or more web pages with a particular category corresponding to the score.

20. The system of claim 19, further comprising:

in response to determining that no score in the respective plurality of scores for a web page satisfy a threshold, providing the web page to a user for manual categorization; and associating the web page with a category specified by the user.

21. The system of claim 18, wherein determining, based on the statistical analysis, respective categorizations of one or more web page segments in the one or more web pages in the financial institution website comprises:

determining a respective plurality of scores for each web page segment in the one or more web pages, each score in the plurality of scores indicating a confidence that a web page segment corresponds to a particular category;

determining, for each web page segment, whether a score in the respective plurality of scores satisfies a threshold; and in response to determining that a score in the respective plurality of scores for a web page segment satisfies a threshold, associating the web page segment with a particular category corresponding to the score.

22. The system of claim 21, further comprising:

in response to determining that no score in the respective plurality of scores for a web page segment satisfy a threshold, providing the web page segment to a user for manual categorization; and associating the web page segment with a category specified by the user.

23. The system of claim 17, wherein the statistical analysis of (i) web pages and (ii) web page segments comprises:

generating, based on one or more machine learning techniques, a first data model that models a relationship between a serialized DOM of web pages to respective categories of the web pages;

generating, based on one or more machine learning techniques, a second data model that models a relationship between a serialized DOM of web page segments to respective categories of the web page segments; and using the first and second data models to respectively categorize web pages and web page segments in the financial institution website.

24. The system of claim 17, wherein generating, based on the site map of the financial institution website, a site-specific script for extracting financial data from the financial institution website does not require human input.

\* \* \* \* \*